US005544842A

United States Patent [19]

Smith et al.

[11] Patent Number: 5,544,842
[45] Date of Patent: Aug. 13, 1996

[54] APPARATUS AND METHOD FOR THE CONVERSION OF A THREE CREW MEMBER AIRCRAFT COCKPIT TO A TWO CREW MEMBER AIRCRAFT COCKPIT

[76] Inventors: Edward Smith, 429 Cottage Grove Rd. P.O. Box 2159, Lake Arrowhead, Calif. 92352; Richard Taylor, 6617 Vickiview Dr., West Hills, Calif. 91307

[21] Appl. No.: 124,976

[22] Filed: Sep. 21, 1993

[51] Int. Cl.$^6$ ................................................ B64D 43/00
[52] U.S. Cl. .................................. 244/1 R; 244/118.5
[58] Field of Search .................... 244/1 R, 118.5, 244/220, 221; D12/192; 248/27.1

[56] References Cited

PUBLICATIONS

Richard P. Shipman, "727: The New Look" in *Air Line Pilot*, Sep. 1988.
"727 Page Avjet/Kollsman" proposal, 1988.
G. Fred Ward et al., *KC–135 Crew Reduction Feasibility Demonstration Simulation Study*, vol. 1–3, USAF Document ADS–TR–91–5005, Air Force Systems Command, Wright--Patterson A.F.B., Jun. 1991.

Lockheed Horizons, #14, 1983, Photograph on p. 20.
Flight International, 03 Oct. 1981, "The Panel of Experts", p. 993.
British Aerospace Brochure, "The Advanced Flight Deck", Presented at an AIAA Conference, 08 Feb. 1979.

*Primary Examiner*—Andres Kashnikow
*Attorney, Agent, or Firm*—Howell & Haferakmp, L.C.

[57] ABSTRACT

Apparatus and a method are provided for converting a three pilot aircraft cockpit to a two pilot aircraft cockpit including relocating, without change, some control instruments from their existing positions to new instrument panels within reach of the remaining two crew members, the captain or pilot and first officer or copilot, modifying other control instruments for pilot workload reduction, and including the addition of a monitoring means to the cockpit for providing visual caution indicators responsive to caution indicators among the repositioned control instruments that are not within direct sight of the remaining two crew members.

35 Claims, 7 Drawing Sheets

APPARATUS AND METHOD FOR THE CONVERSION OF A THREE CREW MEMBER AIRCRAFT COCKPIT TO A TWO CREW MEMBER AIRCRAFT COCKPIT

BACKGROUND OF THE INVENTION (1) Field of the Invention

The present invention pertains to a conversion of a three pilot aircraft cockpit to a two pilot aircraft cockpit including the apparatus and method involved in relocating, without change, control instruments from their existing positions in the cockpit within the reach of the third crew member to new positions within reach of the remaining two crew members. Certain of these systems are simplified and automated for pilot workload reduction. The invention also involves the addition of a monitoring means for providing visual caution indicators in the line of sight of the remaining two crew members responsive to caution indicators among the repositioned control instruments that are not within direct sight of the remaining two crew members.

(2) Description of the Related Art

Older air transport category turbojet aircraft, typically classified as second generation turbojet civil aircraft within the aircraft industry (such as the DC-8, the Boeing 707, and Boeing 727) often employ three air crew members; a pilot or captain, a copilot or first officer, and a flight engineer who is also a pilot. The third crew member position of flight engineer on complex multiengined aircraft dating back to the 1940's involved a third pilot of an air crew in monitoring engine conditions, fuel state, and various other aircraft systems which require constant adjustment during operation of the aircraft. Some second generation aircraft, notably the Boeing 727, were developed, certified and manufactured on the cusp between second generation turbojet aircraft and the third generation jet-age aircraft (such as the Boeing 737, the MD-88, and the Airbus A-320). As such, the 727 incorporated the advancements in engine and control systems technology which no longer required the intense and constant monitoring adjustments of older aircraft provided by the third crew member flight engineer, but were nonetheless certified with a flight engineer to provide such monitoring. The Boeing 727 was not the only aircraft to retain the third crew member flight engineer's position, and other three-pilot aircraft include: of civil aircraft, the DC-8, the B-707, the DC-10, the L-1011 and the Airbus A-300; and on the military side, the C-130, the C-141, the C-5, and the KC-10.

It has long been recognized in the aviation industry that conversion of a three pilot or three crew member aircraft to a two pilot or two crew member aircraft would be extremely effective in reducing the operating costs for the aircraft involved in the conversion. The elimination of the third pilot or crew member flight engineer's position has been determined to provide the following economic benefits:

1) The savings resulting from the elimination of the salary and employment-related benefits of the third crew member eliminated from each air crew assigned to each air frame. Freight aircraft operators typically maintain a ratio of three air crews to each air frame, with each air crew consisting of three pilots or crew members. Passenger aircraft operators typically maintain a ratio of air crews which is closer to six air crews per air frame with each air crew consisting of three pilots or crew members. Thus, the elimination of the third pilot or the flight engineer's position from each air crew of freight aircraft or passenger aircraft operators reduces the overall required air crew staffing of the operators from 3–6 pilots per air frame per year.

2) For many passenger aircraft operators and for some air freight operators, in order to make schedules throughout their air routes around the world, crews will be flown by company aircraft or other carriers to various destinations to staff flights. The practice of providing these crews at these various destinations incurs an expense for the transportation of these air crews and their lodging at hotels and other associated miscellaneous expenses. The elimination of the third crew member pilot or flight engineer's position, eliminating every third crew member from an air crew, reduces these expenses by 33%.

3) Providing the third crew member pilot, the flight engineer, in each air crew also incurs training expenses unique to the flight engineer's position, both initial training of the duties involved in the flight engineer's position and recurrent training to keep the flight engineer's skills sharp. Elimination of the third crew member pilot, the flight engineer position, eliminates these training expenses as well as the expenses associated with flight engineer instructors and the associated training aids and documentation.

In 1992, it was estimated that the elimination of the third pilot crew member, the flight engineer position, would save approximately $250,000 per aircraft per year for a freight aircraft fleet operator, to $400,000 per aircraft per year for a passenger aircraft fleet operator.

Several companies in the aviation industry, recognizing the potential for cost cutting and savings in the conversion of three pilot aircraft to two pilot aircraft, have proposed development programs which would lead to the certification and fabrication of a "kit of components" comprising computers and software which, when installed on the aircraft, will convert the aircraft to a two pilot aircraft. These efforts have been directed primarily at the Boeing 727 aircraft since over 700 of these aircraft are in active use in the world's aircraft inventory. However, the success of these efforts is questionable, generally because the development and certification costs involved with the "kits of components" and their associated installation costs are substantial. The cost barriers to success have deterred the vital and much needed modification of the three pilot air crew trijet Boeing 727 to a two pilot air crew aircraft, rendering the aircraft much less competitive to operate than the more modern aircraft in use today. Yet the 727 remains the safest of all second generation aircraft and is one of the safest aircraft in the history of the aviation industry over all generations of turbojets.

Three principal barriers to the successful conversion of the 727 aircraft to a two pilot air crew aircraft have been identified. In many instances, developers of a two pilot air crew conversion have set out a scope of modernization of the aircraft which includes not only elimination of the third crew member flight engineer's position, but also adds improvements to fuel, electrical and pressurization systems. These added improvements expanded the amounts of non-recurring engineering associated with the two pilot air crew modification, driving up the costs associated with the modernization per aircraft.

Many developers also included in their two pilot air crew conversion what is referred to in the aircraft industry as "glass cockpit" meaning that all primary flight, navigation and systems displays are presented on cathode-ray tubes (CRTs). The CRT-based displays require the creation of substantial software associated with the displays to achieve the reading and conversion of analog control inputs/outputs for display on the CRT screens to the remaining two pilots in the aircraft cockpit. The software associated with these modernization efforts involves significant man hours for its creation which also drives up the unit cost of aircraft modernization.

Before an aircraft is allowed to operate in the airspace of the United States, whether a new aircraft or a modification of an older aircraft, it must have a "type certification" (TC), meaning that the Federal Aviation Administration (FAA) has reviewed all documentation and has observed flight testing of the applicant aircraft. Certification is an expensive and time consuming process and, for any new aircraft type, generally requires years of testing and millions of dollars expended to certify the applicant aircraft under a particular set of certification rules. Any modification to an existing aircraft is also tested and, if approved, becomes a "supplemental-type certification" (STC).

The original type certificate (TC) for the Boeing 727 was issued under the CAR 4B Rules, a set of FAA rules which, in brief, required redundancy in critical aircraft systems, but not to the extent of requiring fail-safe operation of these critical systems as currently defined by the FAA, the fail-safe level being defined in "Part 25" of the Rules. Substantial modifications to the 727's systems invoke Part 25 of the Rules, which require conversion of those critical systems to a fail-safe level of operation. Conversion of the 727 systems to a Part 25 aircraft with fail-safe level systems is extremely expensive, representing thousands of man hours in the redesign of the systems effected.

All glass cockpit solutions, involving software associated with the CRTs, also require FAA oversight under Part 25 of the Rules, requiring the certification applicant to prove fail-safe operation of all software to a determined level of probability. In short, unless the majority of the supplemental type certificate (STC) observation and documentation procedures can be conducted under CAR-4B rules, the unit costs associated with aircraft modification are driven up to the point that the investment in the supplemental type certificate (STC) for the Boeing 727 cannot be returned.

SUMMARY OF THE INVENTION

The apparatus and method of the present invention overcome the aforesaid problems associated with prior art ventures into the conversion of a three pilot air crew cockpit to a two pilot cockpit, and provide a cost effective conversion of any of the second generation three pilot turbojet aircraft to two pilot aircraft.

The apparatus and method of the invention provide electronic "structure" which are installed in lieu of the existing control instruments of critical, work intensive systems located on the conventional flight engineer's instrument panel. The electronic structure acts to manipulate, physically or electronically, the existing systems of the converted aircraft as if they were in fact being manipulated or operated by the third crew member flight engineer. In addition, certain systems are improved by providing means of electronically monitoring those systems in place of human attention that has been required in the past, thereby simplifying these systems. The primary advantage of the apparatus and method of the invention is the provision of a general, low cost method of converting a three pilot air crew cockpit to a two pilot air crew cockpit which can be applied to any of the second generation turbojet aircraft existing, further allowing the certification of the modified aircraft under their original certification rules.

Generally, the invention provides apparatus and a method for relocating instrument controls from the flight engineer's instrument panel to positions in the cockpit closer to the remaining two pilot air crew, the captain or pilot and the first officer or copilot, where these relocated instruments are accessible for monitoring and operation by the two pilot air crew. A part of the uniqueness of the apparatus and method of the invention is that, although they make use of stored program computers, they do not involve a "glass cockpit" type of conversion with CRT-based displays, thereby avoiding the significant costs involved in the creation of the substantial software required to achieve the reading and conversion of analog control inputs/outputs for display on the CRT screens. No existing aircraft systems are changed by employing the apparatus and the method of conversion provided by the present invention. This advantage of the invention is most significant because the supplemental type certification (STC) can be granted by the FAA for an aircraft modified in accordance with the invention under the CAR-4B rules of certification.

The apparatus of the invention includes a master caution system that monitors all critical panel warning systems, some of which may be out of the direct line of sight of the two crew member pilots. When any cautionary or emergency indicator positioned on an instrument panel out of the direct line of sight of the pilots is illuminated, the master caution warning lights in the normal line of sight of the two pilot crew members illuminate as well.

Because the conversion method of the present invention involves no changes in the aircraft systems, but primarily involves automating controls such as fuel, electrical, and environmental systems' controls for ease of operation by the two member crew, and relocating existing instruments from the flight engineer's instrument panel to positions where they are accessible by the captain or pilot crew member and/or the first officer or copilot crew member, the installation of the conversion may be performed in less time than a week. This short installation period is extremely significant in that the aircraft's down time is kept to a minimum.

In a described preferred embodiment of the inventive apparatus and method, a Boeing 727 three pilot air crew aircraft is converted to a two pilot air crew aircraft. In the described embodiment, the flight engineer's control panels are relocated to an extended overhead panel added between and over the captain's or pilot's seat and the first officer's or copilot's seat, and to a first officer's auxiliary panel mounted to the cockpit bulkhead adjacent the first officer's seat. All relocation of flight engineer instrument panel instruments is done without modification to the aircraft systems except to the fuel panel, the electrical panel, and the environmental control systems panel. The fuel panel, electrical panel and environmental control systems panel are all modified to be more compact and include partial automation of these systems to reduce crew member workload. A master caution system is installed in the cockpit to monitor irregular and critical warning indicators out of the direct line of sight of the two crew members. In order that the two crew members not leave their seats during a landing gear extension failure, a mechanism provides gear extension capability from a seated captain or first officer's position.

BRIEF DESCRIPTION OF THE DRAWINGS

Further objects and features of the present invention are revealed in the following detailed description of the preferred embodiment of the invention and in the drawing figures wherein.

DESCRIPTION OF THE PREFERRED EMBODIMENT

The present invention includes both the apparatus and method involved in making flight deck instrumentation changes to an existing Boeing 727-200 series aircraft in order to reduce the air crew complement from a three member crew (pilot, copilot and flight engineer) to a two member crew (pilot and copilot). The changes made to the flight deck according to the invention include relocation of flight engineer instruments from the flight engineer's panel and the flight engineer's auxiliary panel, relocation of the manual landing Gear extension, and installation of a master caution light cluster and an engine pressure ratio (EPR) computer. The electrical, fuel and pressurization systems that have heretofore been monitored by the third crew member flight engineer and that according to the present invention are monitored by the first crew member (the captain or pilot) and the second crew member (the first officer or copilot) have been simplified so as not to overburden the two member crew.

Figures 1, 8, 9:
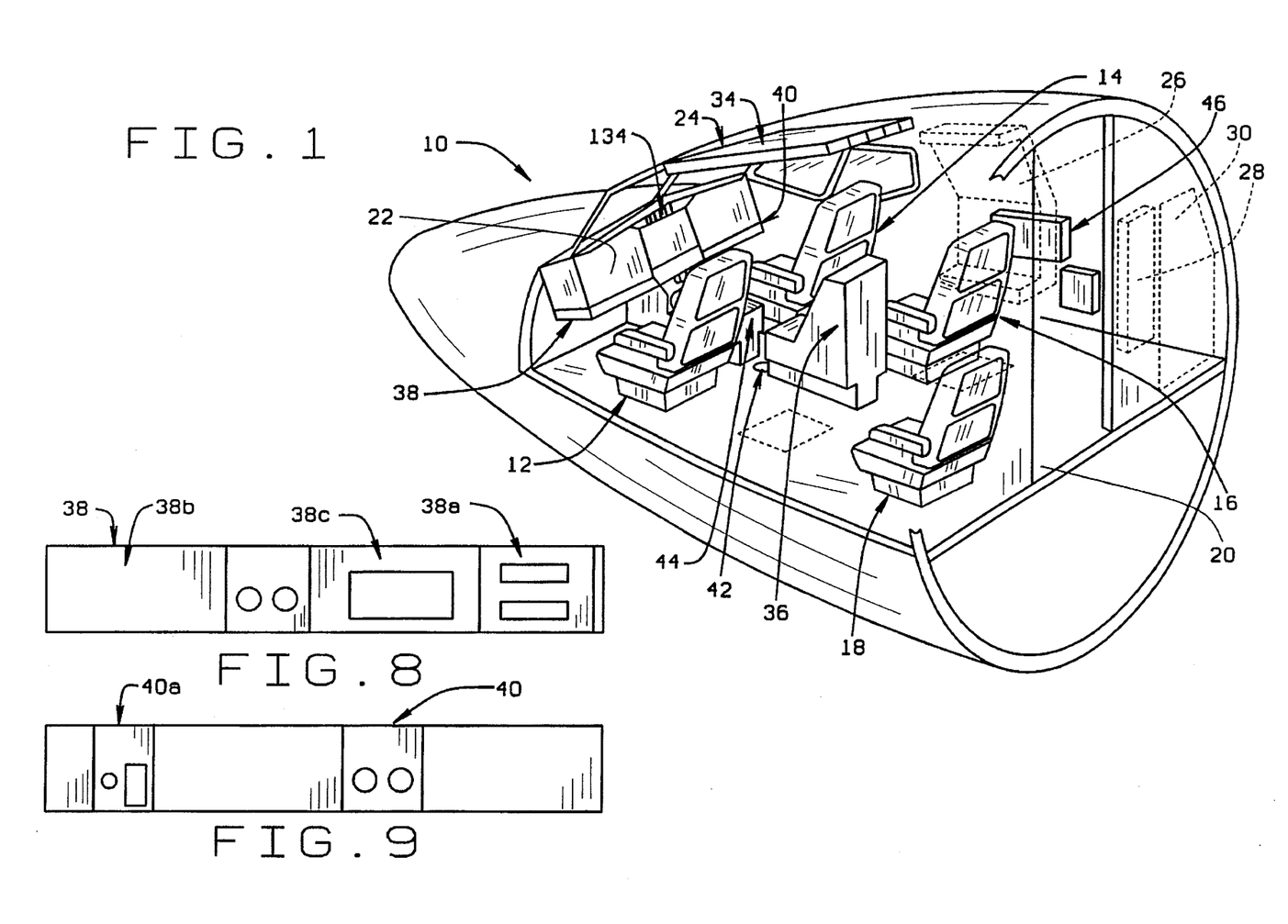
FIG. 1 is a partial perspective view of the cockpit of a Boeing 727 aircraft embodying the apparatus of the invention constructed in accordance with the method of the invention.
FIG. 8 is an illustration of the captain's knee instrument panel of the invention.
FIG. 9 is an illustration of the first officer's knee instrument panel of the invention.

FIG. 1 shows a standard Boeing 727-200 series aircraft cockpit converted from a three crew member cockpit to a two crew member cockpit by the apparatus and according to the method of the present invention. The standard components of the cockpit interior include four seats 12, 14, 16, 18 mounted to the floor 20 of the cockpit including a first crew member's seat 12 (captain or pilot), a second crew member's seat 14 (first officer or copilot), a third crew member's seat 16 (flight engineer) and a fourth jump seat 18. The forward instrument control panel 22 is positioned directly in front of the captain's and first officer's seats 12, 14 and the overhead instrument panel 24 is positioned directly above and between these two forward seats. The flight engineer's instrument panel 26 is shown in dashed lines on the side bulkhead of the cockpit 10 adjacent the flight engineer's seat 16. The flight engineer's auxiliary instrument panel 28 and the fuse panel 30 are shown in dashed lines adjacent each other on the back bulkhead wall of the cockpit. All of the above referred to components are conventional in the 727 cockpit and all are positioned in the cockpit substantially as shown in FIG. 1 for different configurations of the 727 series of aircraft.

The conversion of the standard 727 cockpit shown in FIG. 1 from a three crew member to a two crew member cockpit involves the addition of several instrument panels to the cockpit. These additional instrument panels are provided to mount the control instruments relocated from the flight engineer's instrument panel 26 and the flight engineer's auxiliary instrument panel 28 to positions in the cockpit where they are accessible for operation by the first crew member (captain or pilot) from the captain's seat 12 and by the second crew member (first officer or copilot) from the first officer's seat 14. These added instrument panels include an extended overhead instrument panel 34, an aft pedestal instrument panel 36, a captain's knee instrument panel 38, and a first officer's knee instrument panel 40. The extended overhead instrument panel 34 is added in place of the overhead panel of the standard 727 aircraft. As can be seen in FIG. 1, each of these four instrument panels added to the cockpit are accessible from the captain's seat 12 or first officer's seat 14. In the conversion of the cockpit to a two crew member cockpit, control instruments are removed from the flight engineer's instrument panel 26 and the flight engineer's auxiliary instrument panel 28 and are relocated to the four instrument panels added to the cockpit.

An additional modification made to the cockpit 10 in the conversion from a three crew member to a two crew member cockpit involves relocating the manual landing gear extension port 42 just behind the existing pedestal 44 of the cockpit. The repositioned manual landing gear extension port 42 is accessible by either of the crew members sitting in the captain's seat 12 or the first officer's seat 14.

When the conversion of the invention is complete and all of the control instruments have been removed from the flight engineer's instrument panel 26 and the flight engineer's auxiliary instrument panel 28, these two panels will be removed from the cockpit as illustrated by the dashed lines representing the panels in FIG. 1. The electrical cables for the control instruments removed from the flight engineer's instrument panel 26 will be terminated on a junction box 46 added to the side bulkhead of the cockpit in place of the panels.

The control instruments removed from the flight engineer's instrument panel and the flight engineer's auxiliary instrument panel are relocated and mounted on the extended overhead instrument panel 34, the aft pedestal instrument panel 36, the captain's knee instrument panel 38, and the first officer's knee instrument panel 40 as follows:

Extended Overhead Instrument Panel

Figure 2:
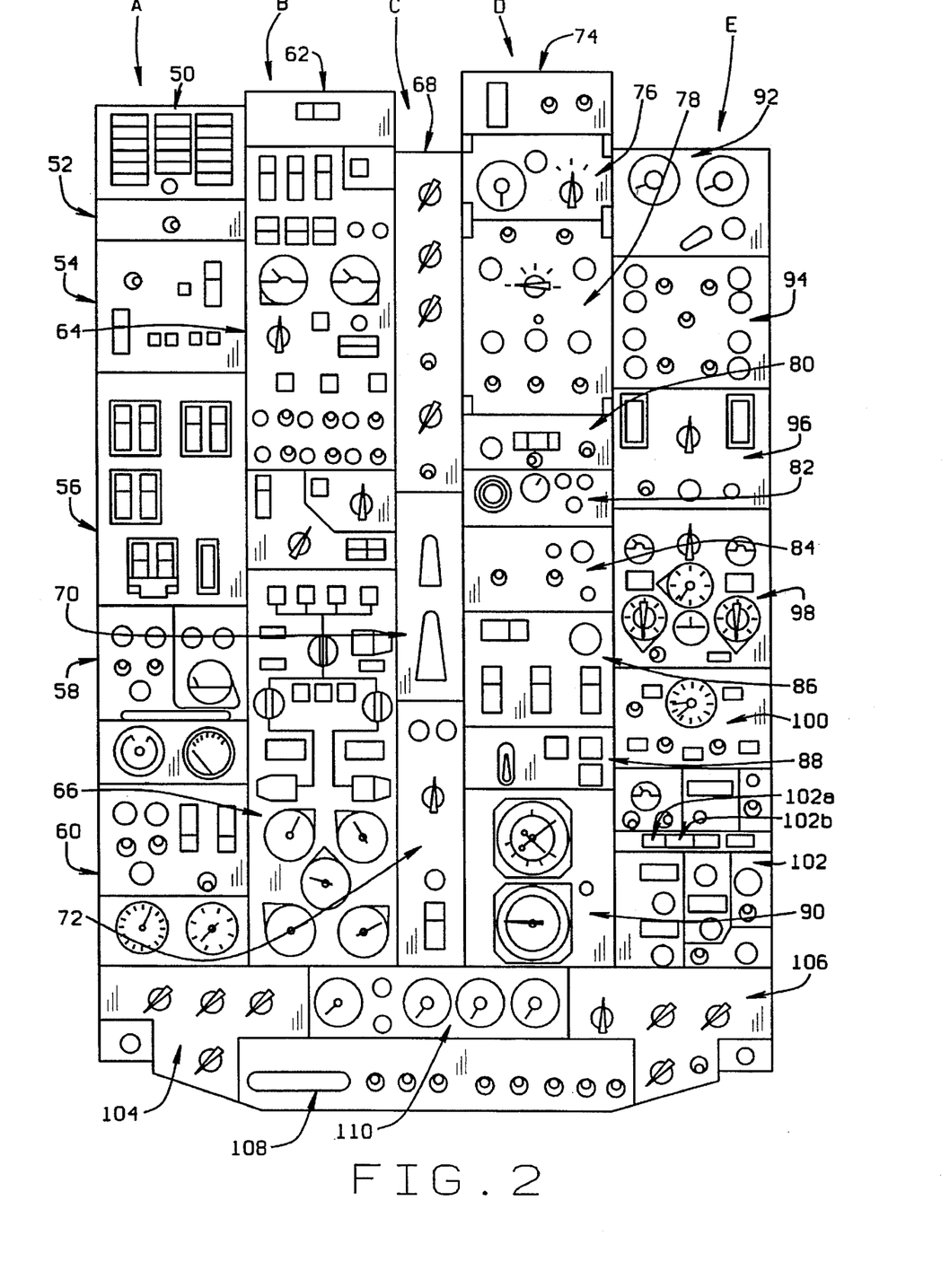
FIG. 2 is a schematic illustration of the extended overhead panel of the apparatus of the invention.

The extended overhead instrument panel 34 mounts the hydraulic, fuel, electrical and environmental control instruments, as well as ancillary controls and indicators. The control instruments relocated from the flight engineer's instrument panels to the extended overhead instrument panel 34 are shown in the schematic of FIG. 2. As seen in FIG. 2, each of the relocated instruments are arranged in five parallel stacks A, B, C, D, E with the aftmost instruments of the stacks appearing at the top of FIG. 2, and the forwardmost instruments appearing at the bottom of FIG. 2. Additional relocated instruments extend across the forward ends of the five stacks.

Beginning with the aft end of the leftmost stack A, the stack closest to the captain's seat 12, the door caution indicators 50 are shown relocated from the flight engineer's auxiliary panel 28 of the standard 727 aircraft to the aftmost position of the stack A. These indicators are unmodified from their configuration in the standard 727 aircraft. However, additional wiring communicating the indicators with a master caution panel yet to be described will allow illumination of any caution light indicator to light a door light caution indicator on the master caution panel.

The flight control warning test instrument 52 is relocated from a middle position of the standard 727 overhead panel to an aft position on the stack A. This instrument is unmodified from its configuration or use in the standard 727 aircraft.

The nose landing gear brake and anti-skid instruments 54 are relocated from a forward position on the standard 727 overhead panel to the aft position on the stack A of the extended overhead panel 34. These instruments are unmodified from their configuration or use in the standard 727 aircraft.

The hydraulic power instruments 56 are in approximately the same position on the extended overhead panel 34 as in the standard 727 overhead panel. These instruments are unmodified from their configuration or use in the standard 727 aircraft.

The hydraulic system (B) instruments 58 are relocated from a lower middle position on the flight engineer's instrument panel 26 to a forward position on the stack A of the extended overhead panel 34. These instruments are unmodified from their configuration or use in the standard 727 aircraft.

The hydraulic system (A) instruments 60 are the last of the instruments located in the first stack A of the extended overhead panel 34. These instruments are relocated from the lower middle position on the flight engineer's panel 26 to a forward position on the stack A of the extended overhead instrument panel 34. The instruments are unmodified from their configuration or use in the standard 727 aircraft.

The ground proximity inhibit switch 62 is the first of the instruments positioned on the second stack B of the extended overhead panel 34 and is located at the aftmost position of the second stack B or at the top of the stack as shown in FIG. 2. This instrument 62 is relocated from a middle position of the standard overhead panel of the 727 aircraft. The instrument is unmodified from its configuration or use on the standard 727 aircraft.

The electrical system controls 64 are relocated from an upper left position on the standard flight engineer's instrument panel 26 to a forward position on the stack B of the extended overhead panel 34. The underlying electrical systems are unchanged. However, the interface of the controls to the two pilot crew member conversion of the invention has been simplified and augmented with some automatic features. The principle philosophy behind the redesign of the electrical system controls 64 is that of size reduction, simplicity and workload reduction for the two member crew.

Figure 3:
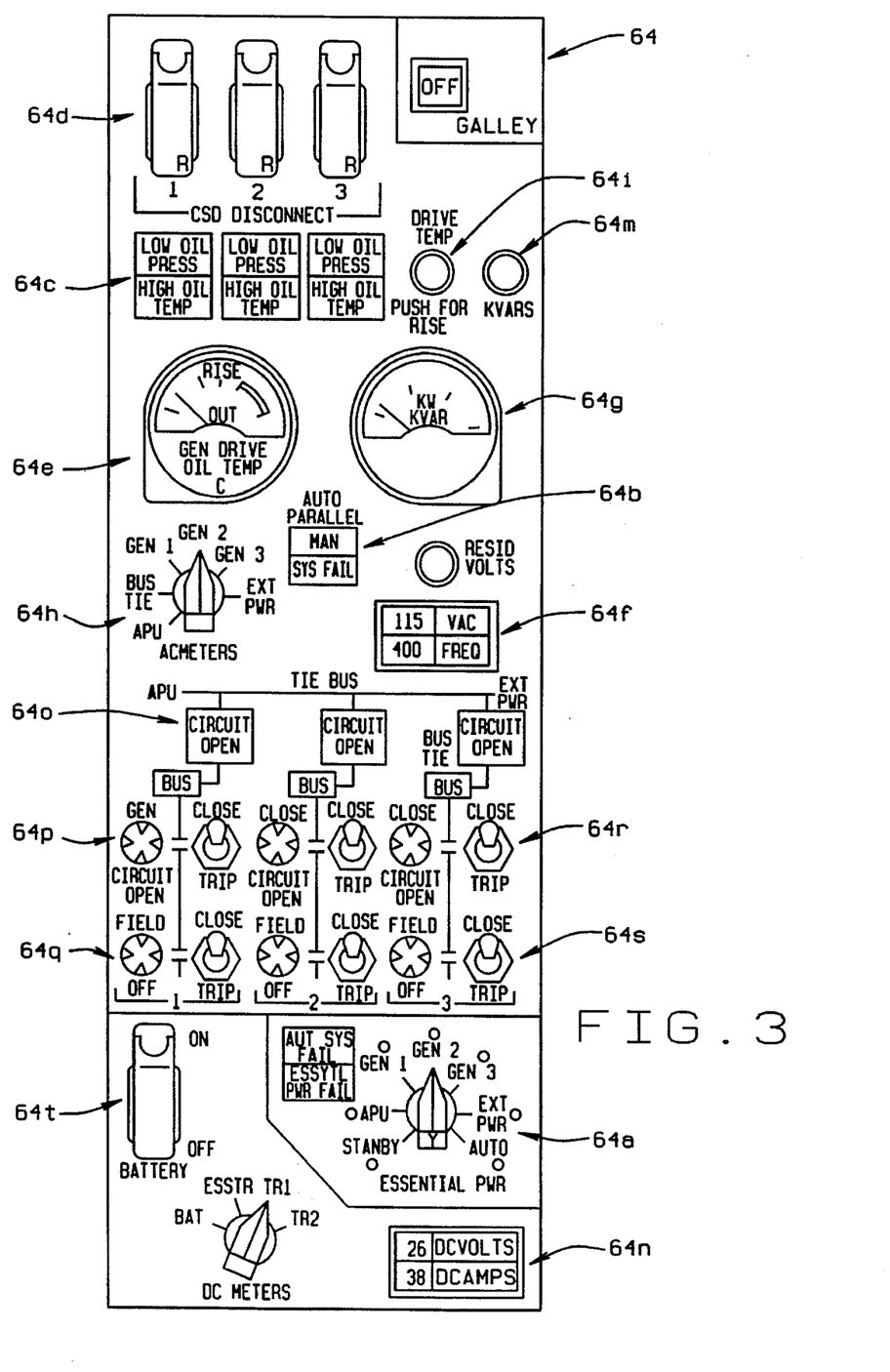
FIG. 3 is a detailed illustration of the electrical system instrument panel of the invention.

A more detailed illustration of the electrical system controls 64 is shown in FIG. 3. These controls have been redesigned to operate in two modes; a manual and auto mode. The manual mode has operational parity with the flight engineer's electrical controls of the standard 727 aircraft and utilizes existing control logic of the aircraft. The auto mode of operation enhances standard controls by performing many of the workload intensive actions without requiring input from either of the two crew members. After pre-flight checks, the two pilot air crew will engage the two auto modes by turning ESSENTIAL PWR (essential power) knob 64a to AUTO and by pressing the AUTO PARALLEL button 64b to its AUTO position wherein the push-button labelled MAN (manual) lights with an AUTO indicator, allowing the system to automatically maintain optimum configuration of the system. If at any time the air crew wishes to override automatic operation of the electrical system controls, either one or both of the above two auto controls 64a, 64b is moved from its AUTO position and the systems are then operated manually using the individual operational controls to be described.

The three low oil pressure indicator lamps of the standard 727 electrical system panel have been changed in the simplified panel shown in FIG. 3 to be part of a dual lamp assembly 64c that has low oil pressure on the top half and high oil temperature on the bottom half. The low oil pressure lamp is driven from the same source as in the standard 727 aircraft. The high temperature lamp is derived from monitoring the generator oil temperature and the generator oil temperature rise. If the oil temperature is about 130° C. or the rise is about 20° C., the effective generator high temperature lamp is illuminated.

The three generator disconnects 64d, function identically to the disconnect switches of the electrical system controls of the standard 727 aircraft.

The number of indicator dials of the simplified electrical system controls of FIG. 3 has been reduced as most monitoring is automatic. The generator drive oil temperature 64e, the AC voltmeter, the AC frequency meter 64f and the KW/KVAR power meter 64g are all shared by the three generators, and are activated by the same rotary switch 64h which selects the source signals for the meters. With the selector switch 64h in the GEN 1, 2 or 3 position, the generator drive oil temperature gauge 64e will read the appropriate generator oil temperature. If the RISE button 64i is depressed then the oil rise temperature will be read from the gauge. If the selector switch 64h is in the position of APU, BUS TIE, or EXT PWR, the oil temperature gauge will read zero.

The AC voltage and AC frequency meters 64f measure the voltage and frequency of the source selected by the rotary switch 64h. They have been changed from the standard analog dial of the three crew member 727 aircraft to a digital readout and are combined on a single display in the simplified controls of FIG. 3.

The KW/KVAR power meters that are standard on the three crew member 727 aircraft have been replaced in the simplified controls of FIG. 3 by a single power meter 64g. The power scale displayed on the KW/KVAR meter 64g is selectable by depressing the scale select button or KVAR button 64m. Usually, power is displayed by the meter 64g in the KW scale. Depressing the KVAR button 64m switches the meter scale to KVAR.

The DC volts and amperes meters of the standard 727 three crew member aircraft have been combined on a single digital display 64n. No other changes have been made to the DC volts and amperes monitoring system from the standard 727 aircraft.

The ESSENTIAL PWR switch of the three crew member standard 727 aircraft is replaced by a similar switch 64a containing one additional position, AUTO. With the AUTO position selected, the system will automatically switch generator sources if a loss of AC is detected for the selected generator source. In either AUTO or manual operation, the selected source is indicated by a lighted lamp. With the system in the AUTO mode, generator 3 is the primary source of power selected. Should generator 3 fail, AUTO ESSENTIAL PWR automatically switches to generator 1, and performs automatic load shedding of the galley power with loss of the generator. So that the air crew can run the galley on less than all generators, the electrical system will not shed galley power based upon the quantity of generators but only on the loss of a selected operational generator. Manual override capability is always available through adjustments to the ESSENTIAL PWR switch 64a. The loss of a generator causes the generator trip and field trip lights 64p, 64q to illuminate and Sends a caution signal to the master caution panel yet to be described. If generator 1 then fails, AUTO ESSENTIAL PWR selects generator 2. If all three generators fail, and no APU (auxiliary power unit) or EXT PWR (external power) is available, AUTO ESSENTIAL PWR will select standby power.

If the ESSENTIAL PWR AUTO position is not selected by the switch 64a, then the essential power pointed to by the rotary switch is selected. In the event of a generator failure of a selected source, the crew must manually select another source. Auto select logic is designed such that a failure of the logic or its power source will cause the system to switch to STANBY (standby).

The AUTO PARALLEL pushbutton switch 64b is added to the simplified electrical system controls of FIG. 3 to allow the generator system to automatically engage various breakers under certain conditions. In the ON position the system monitors the voltage and frequency of each generator and the TIE BUS 64o, GEN CIRCUIT OPEN (generator breaker) 64p and FIELD 64q trip lamp signals to determine if a generator off line condition exists. The system continuously tests for fault conditions and will automatically attempt a correction if a fault is found. The first condition checked with any fault condition is the status of the BUS TIE breaker. If it is open and there is no voltage on the TIE BUS or if the associated generator breaker is open, the AUTO system will reclose the BUS TIE breaker. If a generator is not connected to its load or is not producing proper output (generator breaker or FIELD breaker tripped) then after the TIE BUS is closed the AUTO PARALLEL system will automatically attempt to reconnect. Thus, should a surge drop a generator off the bus tie and disable the generator, AUTO PARALLEL will automatically reconnect this generator. In order to do this, the system first insures that the generator breaker is open and closes the FIELD. It makes any necessary frequency adjustments, synchronizes phase and then closes the generator breaker to bring power back on to the bus. If the TIE BUS remains open, the system will not perform any action on that generator system. The system will attempt to reset a generator system only once, then lock out the auto feature until the crew cycles the AUTO PARALLEL switch from AUTO to MAN then back to AUTO.

In manual mode, the GEN CLOSE/TRIP and FIELD CLOSE/TRIP switches 64r, 64s are the same as in the standard 727 cockpit. After engine start, moving the GEN CLOSE/TRIP to CLOSE connects the generator to its local bus. Moving the GEN CLOSE/TRIP to TRIP disconnects the generator from the local bus. The same is true for the FIELD switches in bringing the generators on line or disconnecting them. In AUTO mode, the system will automatically close the generator switch if the TIE BUS is active once the field is closed.

The battery switch 64t is unchanged from the standard 727 aircraft.

The manual frequency adjustment controls of the standard 727 three crew member aircraft are replaced by frequency monitoring logic and automatic adjustment circuitry. This function will adjust the initial generator to 400 Hz using an internal crystal controlled clock source and all subsequent generators to the TIE BUS to obtain phase synchronization. The protection logic currently in place in all standard 727 aircraft will still be utilized to ensure the generator breakers will not close until synchronization occurs.

Referring back to the illustration of the extended overhead instrument panel 34 of the invention in FIG. 2, the next instruments positioned in the second stack B of the overhead panel 34 are the fuel system instruments 66. These include several instruments relocated from a lower left position of the standard 727 aircraft flight engineer's panel to a forward position on the second stack B of the extended overhead panel 34 of the invention. The underlying fuel system is unchanged. The interface to the two pilot air crew of the present invention has been simplified, and the fuel heat instruments of a standard 727 aircraft have been incorporated with the fuel instruments 66 of the invention.

Figure 4:
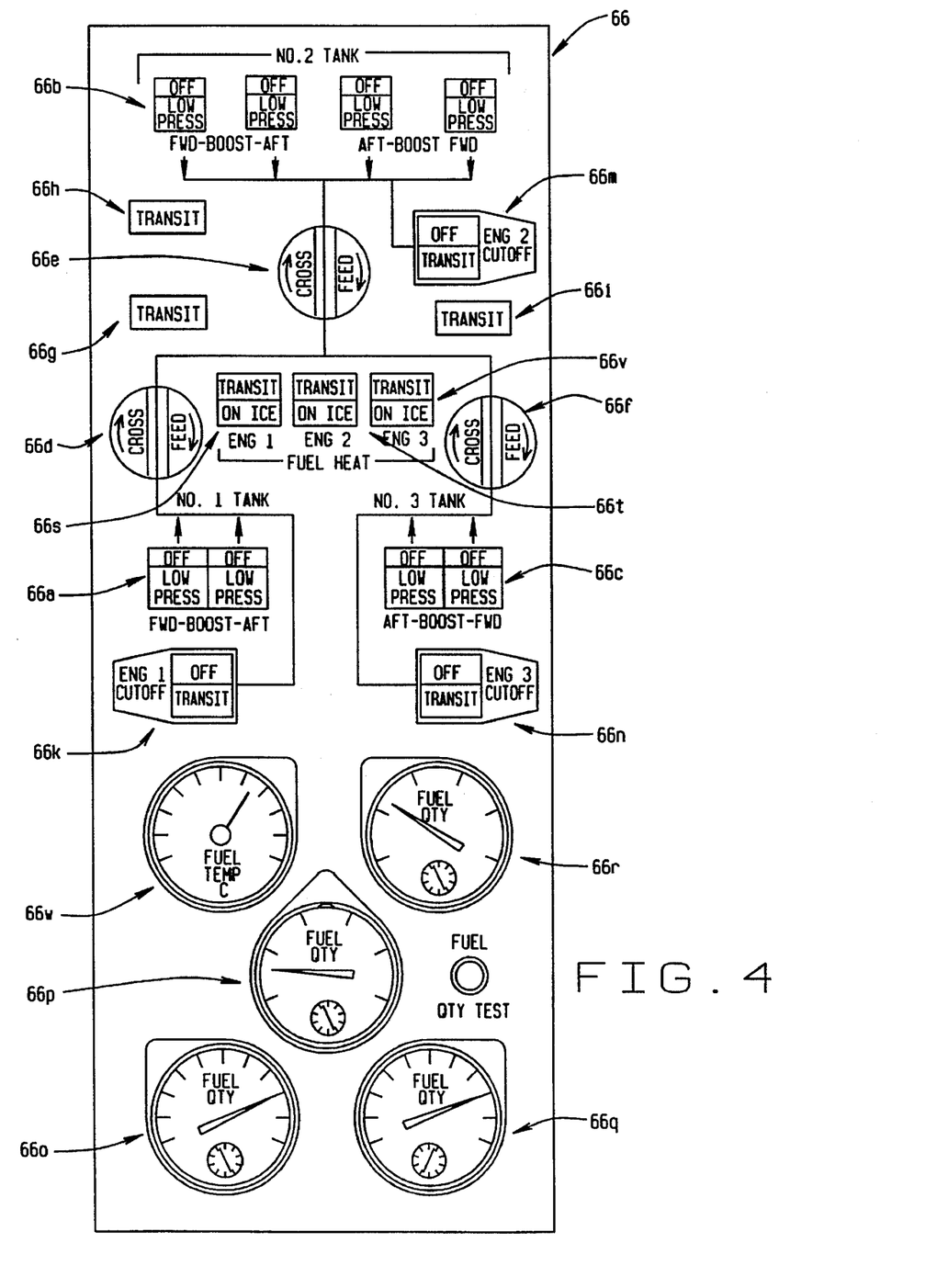
FIG. 4 is a detailed illustration of the fuel system instrument panel of the invention.

The redesign of the fuel instruments 66 is shown in more detail in FIG. 4. The principal philosophy behind the redesign of the fuel instruments 66 is that of panel space reduction and operational simplicity. The simplified fuel system instruments 66 shown in FIG. 4 control three fuel tanks, two wing tanks and a center tank. The auxiliary tank employed in some standard 727 aircraft is not included (either nonexistent or deactivated). Each of the three fuel tanks has its forward and aft tank boost pumps activated by a latching lighted pushbutton 66a, 66b, 66c, that is combined with a low pressure indicator. Three cross-feed valves 66d, 66e, 66f are opened or closed to maintain aircraft balance and during certain flight operations. TRANSIT indicators 66g, 66h, 66i illuminate to indicate when a cross-feed valve is in transit. Any illuminated caution light of the fuel panel (such as ICING) will cause the master caution indicator (yet to be described) and FUEL indicator to be illuminated on the cockpit glare shield.

In normal operation, during take-off, the second crew member, the first officer, will set up the fuel panel by pressing AFT BOOST and FWD BOOST for each of the tanks, and the second set of aft and forward boost pumps on the center tank. When these latching push buttons are depressed, the previously lighted OFF lamp will extinguish. Should a low pressure indication occur, the LOW PRESS light will illuminate.. This is true for any of the boost pumps.

The fuel shut off for each of the three engines 66k, 66m, 66n is located beneath a guarded latching lighted pushbutton. If activated, the particular switch/indicator will light for the engine fuel supply shut off with first the TRANSIT indication illuminating, and then the OFF indicator illuminating once the valve associated with the fuel supply has closed.

The rotary CROSS FEED switches 66d, 66e, 66f will be selected just as in the standard three crew member 727 fuel panel. The TRANSIT indicators 66g, 66h, 66i associated with each of these switches work Just as in the standard 727 aircraft.

All fuel quantity dials 66o, 66p, 66q are as they would appear in the standard 727 aircraft fuel system panel, with a total fuel quantity dial 66r added. All fuel quantity indicators are monitored electronically to determine imbalance between the fuel tanks.

Three fuel heat switches 66s, 66t, 66v are incorporated into the redesigned fuel system controls 66. They are all latching, lighted pushbuttons. When any switch is depressed, the ON indicator illuminates. Should icing be detected, the ICE indicator illuminates. The FUEL TEMP (fuel temperature) dial 66w is standard and is not monitored electronically.

Referring again back to the extended overhead panel 34 shown in FIG. 2, the middle or third vertical stack C of control instruments relocated to the overhead panel includes lighting controls 68 located at the aft end of the middle stack C or at the top of the overhead panel 34 as viewed in FIG. 2. The lighting controls 68 include controls relocated from the forward edge of the standard 727 aircraft overhead lighting panel to the aft position on the stack C of the extended overhead panel 34. The lighting controls 68 of the overhead panel are modified from the standard 727 aircraft lighting controls by being arranged in a vertical arrangement in lieu of the horizontal arrangement of the standard 727 controls and a compass light control is added to the lighting controls with the control stand light controls and overhead lighting controls.

The pedestal lights 70 are positioned in the center stack C in approximately the same position that the pedestal lights occupy between the first crew member or captain's seat and the second crew member or officer's seat 14 of a standard 727 aircraft.

The windshield wiper control and emergency exit light control 72 are in approximately the same position on the center stack C of the extended overhead panel 32 that they occupy in the standard 727 aircraft. These controls are unmodified from their configurations or use in the standard 727 aircraft.

The fourth vertical stack D of control instruments located on the extended overhead instrument panel 34 includes the alternate flaps instruments 74 positioned at the aft end of the fourth stack D or at the top of the stack as shown in FIG. 2. The alternate flaps instruments 74 are relocated further aft on the stack D of the overhead panel 34 than their position in the standard 727 aircraft and are unmodified from their configuration or use in the standard aircraft.

The duct overheat instruments 76 are relocated from their aft position in the fifth stack of the standard 727 aircraft to an aft position in the fourth stack D of the extended overhead panel 34. The duct overheat instruments 76 are unmodified from their configuration or use in the standard 727 aircraft.

The anti-ice instruments 78 are relocated from an aft position in the fifth stack of a standard 727 aircraft to an aft position in the fourth stack D of the extended overhead panel 34. The anti-ice instruments are unmodified from their configuration or use in the standard 727 aircraft, with the addition of a means of transmitting a signal to the EPR computer indicating that the anti-ice system is in use.

The passenger address instruments 80 are relocated from a middle position of the first stack on the standard 727 aircraft overhead panel to an aft position of the fourth stack D of the extended overhead panel 34. The passenger address instruments are unmodified from their configuration or use in the standard 727 aircraft.

The cockpit voice recorder 82 is moved from the second stack of the standard 727 aircraft overhead panel to the fourth stack D of the extended overhead panel 34. The recorder is unmodified from its configuration or use in the standard 727 aircraft.

The cabin attendant instruments 84 are in approximately the same position in the fourth stack D of the extended overhead panel 34 that they occupy in the overhead panel of the standard 727 aircraft. The instruments are unmodified from their configuration or use in the standard 727 aircraft.

The engine start instruments 86 are in approximately the same position on the fourth stack D of the extended overhead panel 34 that they occupy in the overhead panel of the standard 727 aircraft. The instruments are unmodified from their configuration or use in the standard 727 aircraft.

The "elevator feel differential pressure" indicator, the "rudder load limiter" indicator, and the "no equipment cooling" indicator are relocated from the lower right section of the flight engineer's panel of a standard 727 aircraft to an instrument panel 88 in the fourth stack D of the extended overhead panel 34. The CSD oil cooler switch is relocated from the upper left side of the flight engineer's panel of the standard 727 aircraft to the instrument panel 88 in the fourth stack D of the extended overhead panel 34. The indicators and CSD switch are unmodified from their operation in the standard 727 aircraft. However, the elevation feel, rudder load, and no equipment cooling caution indicator lamps are electrically communicated with the master caution panel yet to be described.

The cabin altitude and climb indicators 90 are relocated from the flight engineer's panel of a standard 727 aircraft to a forward location on the fourth stack D of the extended overhead panel 34. These indicators are unmodified from their operation in the standard 727 aircraft.

The fifth stack of instruments on the extreme right side 24 of the extended overhead panel 34 as shown in FIG. 2 begin with the crew and passenger oxygen controls 92 positioned in the aftmost position or top of the stack E as shown in FIG. 2. These controls are relocated from the upper right side of the flight engineer's instrument panel of a standard 727 aircraft to the aft location on the fifth stack E of the extended overhead panel as shown. The controls are unmodified from their configuration or use in the standard 727 aircraft.

The window heat instruments 94 are relocated further aft in the fifth stack E of the extended overhead panel 34 from their position in the standard 727 aircraft overhead panel. These instruments 94 are unmodified from their configuration or use in the standard 727 aircraft. However, additional electrical wiring is connected to the instrument indicators to allow any overheat condition sensed by the system to activate a window heat master caution indicator on the master caution indicator panel yet to be described.

The pitot static heat instruments and indicators 96 are relocated from the upper right side of the flight engineer's panel of a standard 727 aircraft to an aft position on the fifth stack E of the extended overhead panel 34. These instruments and indicators are unmodified from their configuration or use in the standard 727 aircraft.

Figure 5:
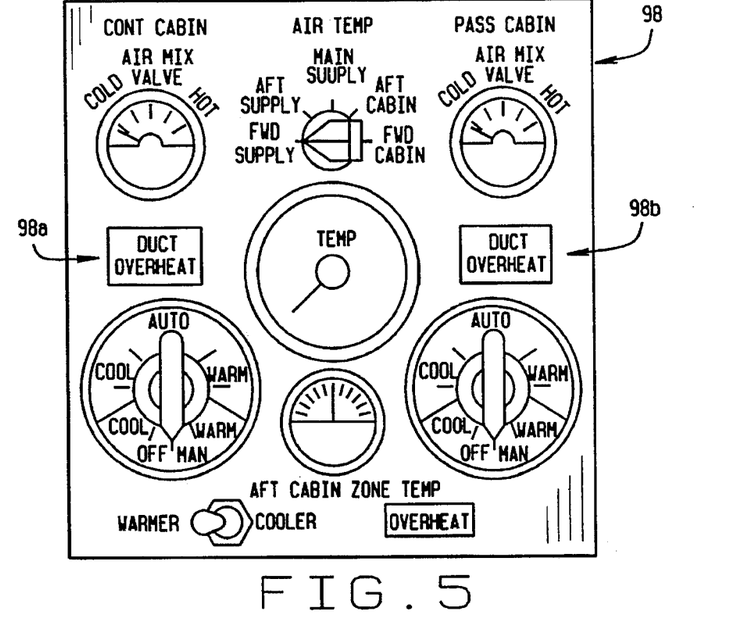
FIG. 5 is a detailed illustration of the temperature control system instrument panel of the invention.

The temperature control instruments 98 are relocated from the upper right side of the flight engineer's panel of a standard 727 aircraft to a middle location on the fifth stack E of the extended overhead panel 34. These instruments have been simplified and condensed to conserve space on the extended overhead panel. The temperature control instruments 98 are shown in more detail in FIG. 5. The simplification of the temperature control systems is accomplished through repackaging, switch/indicator combinations, and sequencing of the pneumatic auto-pack trip operation for automatic load shedding management. Furthermore, the layout of the instrumentation is designed to closely parallel that of the temperature control panel of the B737 aircraft. The temperature control instruments 98 have been repackaged so that they are nearly identical in layout to the B737 temperature control instruments as shown in FIG. 5, and will be easily recognized by crew members of these other aircraft. The DUCT OVERHEAT annunciators 98a, 98b have been repackaged with a built-in reset. Pressing the DUCT OVERHEAT annunciators when illuminated turns off the indicators.

Figure 6:
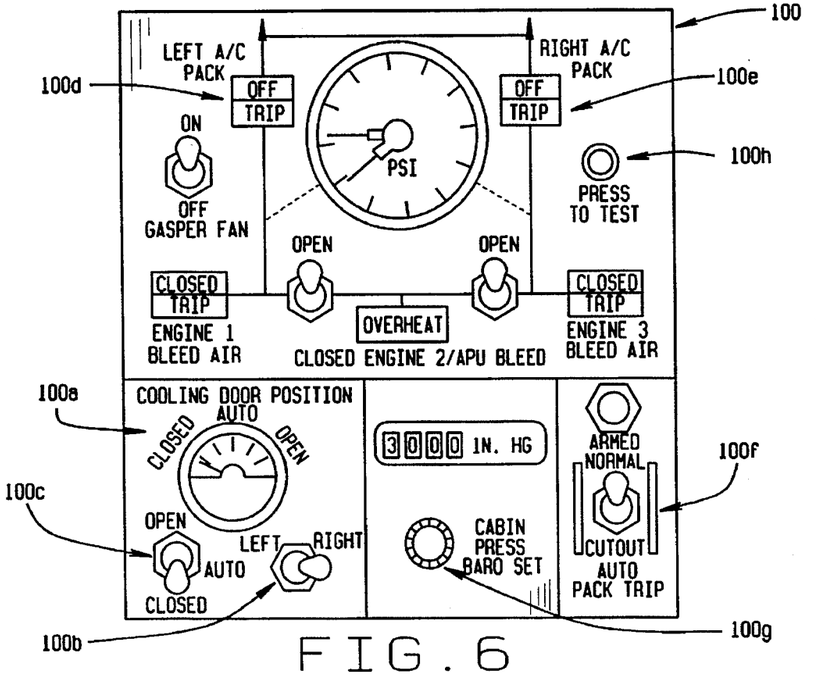
FIG. 6 is a detailed illustration of the A/C pack control system instrument panel of the invention.

Returning to the extended overhead panel shown in FIG. 2, the A/C pack control instruments 100 are relocated from the upper right side of the flight engineer's panel of a standard 727 aircraft to a forward location on the fifth stack E of the extended overhead panel 34. The pressurization system associated with these instruments is unchanged. However, the configuration of the instrumentation for the extended overhead panel 34 of the two crew member cockpit has been simplified. The simplification of the instruments is best seen in the detailed illustration of the instruments shown in FIG. 6. Referring to FIG. 6, several of the functions performed by the instruments are automated to reduce the workload of the two air crew members and to ensure proper procedural operation of the A/C packs and their associated cooling fans. Most of the simplification involves the combination of switches with their associated trip indicators with some switches and indicators deleted, the deleted switches and indicators being no longer required or having been slaved to another operating switch. The on/off operation of the LEFT A/C PACK and RIGHT A/C PACK is now conditionally tied to generator/out operations. The arming of the AUTO PACK TRIP switch has also been tied to the master caution system yet to be described to provide safer operation during aircraft takeoff.

The cooling door indicators of the standard 727 aircraft have been reduced to one indicator 100a and a selector toggle switch 100b for selecting which door is monitored by the indicator gauge 100a. The two original OPEN/CLOSED switches of the standard 727 aircraft have been replaced by a single switch 100c (OPEN-AUTO-CLOSE). The center position of this switch 100c selects the automatic mode. In AUTO, the cooling doors are maintained fully closed when the temperature is below 100° C., half open when the temperature exceeds 105° C. and fully open when the temperature exceeds 110° C. The doors can be activated in a manual mode by putting the switch 100c in either OPEN or CLOSE positions. This will cause both sets of doors to fully open or fully close disconnecting the automatic circuitry.

The cargo heat outflow valve switch is normally open and is tied to the operation of both A/C packs. Should either A/C pack be shut down, the cargo heat outflow valve will close.

Pack operation is controlled by left and right A/C pack pushbutton switches 100d, 100e. The switches 100d, 100e replace the pack ON/OFF switches, the TRIP OFF lights and the RESET button of the standard 727 aircraft. Pressing these new switches 100d, 100e when a pack is off activates the associated pack as long as no overheat conditions exist. Pressing these switches when the pack is on will turn the associated pack off. The switches 100d, 100e incorporate OFF lights which illuminate whenever the associated pack valve is closed by the switch command, or by an overheat condition, or by the auto pack trip system during aircraft take off.

There are two systems that control the automatic shutdown of the A/C packs. The existing system of the standard 727 aircraft, based upon the AUTO PACK TRIP system, which shuts down the packs in response to loss of one or more engines during take-off, and the added auto pack shed system which reduces the crew member workload and protects against accidental generator trips by monitoring generator operation and aircraft flap conditions. The AUTO PACK TRIP system, when armed for take off will cause shut down of both packs and their cooling fans when an engine failure occurs with the aircraft's flaps deployed. If the flaps are subsequently retracted, this system is disabled and no longer protects against the packs and cooling fans operating during less than full equipment conditions. Depending on the electrical load during this phase of flight, the restart of a pack and its cooling fans could cause one or all generators to trip. The automatic circuitry of the added auto pack shed system will prevent this from happening by controlling the pack and fan operation. The automatic circuitry for the pack system prevents the packs and/or their fans from operating as appropriate, whenever a generator-out or engine-out condition exists. Manual override of packs is always available. The auto pack trip is also tied into the master caution indicator panel yet to be described such that if the system is not armed when throttles are advanced to 1.5 EPR, a take off configuration warning is generated. The requirement for resetting the pack system following an engine thrust loss on take-off has been eliminated since cooling fan operation, and possible electrical system failure, cannot occur.

The auto trip switch 100f and the barometer set 100g have also been relocated to the pack control instruments 100 from the flight engineer's panel of the standard 727 aircraft. An additional switch 100h has been added to perform lamp tests for all lights on this panel.

Returning to the extended overhead panel 34 shown in FIG. 2, the fifth stack E of control instruments is completed by the pressurization control instruments 102 which are relocated from the right side of the flight engineer's panel in the standard 727 aircraft to a forward position on the fifth stack E of the extended overhead panel. The instruments are unmodified from their configuration or use in the standard 727 aircraft. However, the auto fail 102a and off schedule descent 102b caution indicators are tied into the cabin pressure master caution indicator of the master caution panel yet to be described, and illumination of either of the auto fail or off schedule descent indicators of the pressure control instruments 102 will cause the cabin pressure master caution lamp to also illuminate.

Across the forward edge of the five stacks of the extended overhead panel 34 are lighting controls and engine oil indicators. The forward left lighting controls 104 are modified from their configuration on the standard 727 aircraft and include left and center forward panel lighting controls as well as the forward panel background and map lighting controls. The forward right lighting controls 106 are unchanged from their configuration, position or use in the standard 727 aircraft. The forward center lighting controls 108 are in approximately the same position on the extended overhead panel 34 as they occupy in the standard 727 aircraft overhead panel. These controls are unmodified from their configuration or use in the standard 727 aircraft. The engine oil indicators 110 are relocated from the middle of the flight engineer's panel of the standard 727 aircraft to the forward lighting panel position on the extended overhead panel 34 shown in FIG. 2. The underlying engine oil indication system is unchanged. However, the display to the two crew members has been simplified. The simplification consists of converting the oil temperature and pressure gauges to split gauges and using only one oil quantity gauge with a selector switch.

Aft Pedestal Instrument Panel

Figure 7:
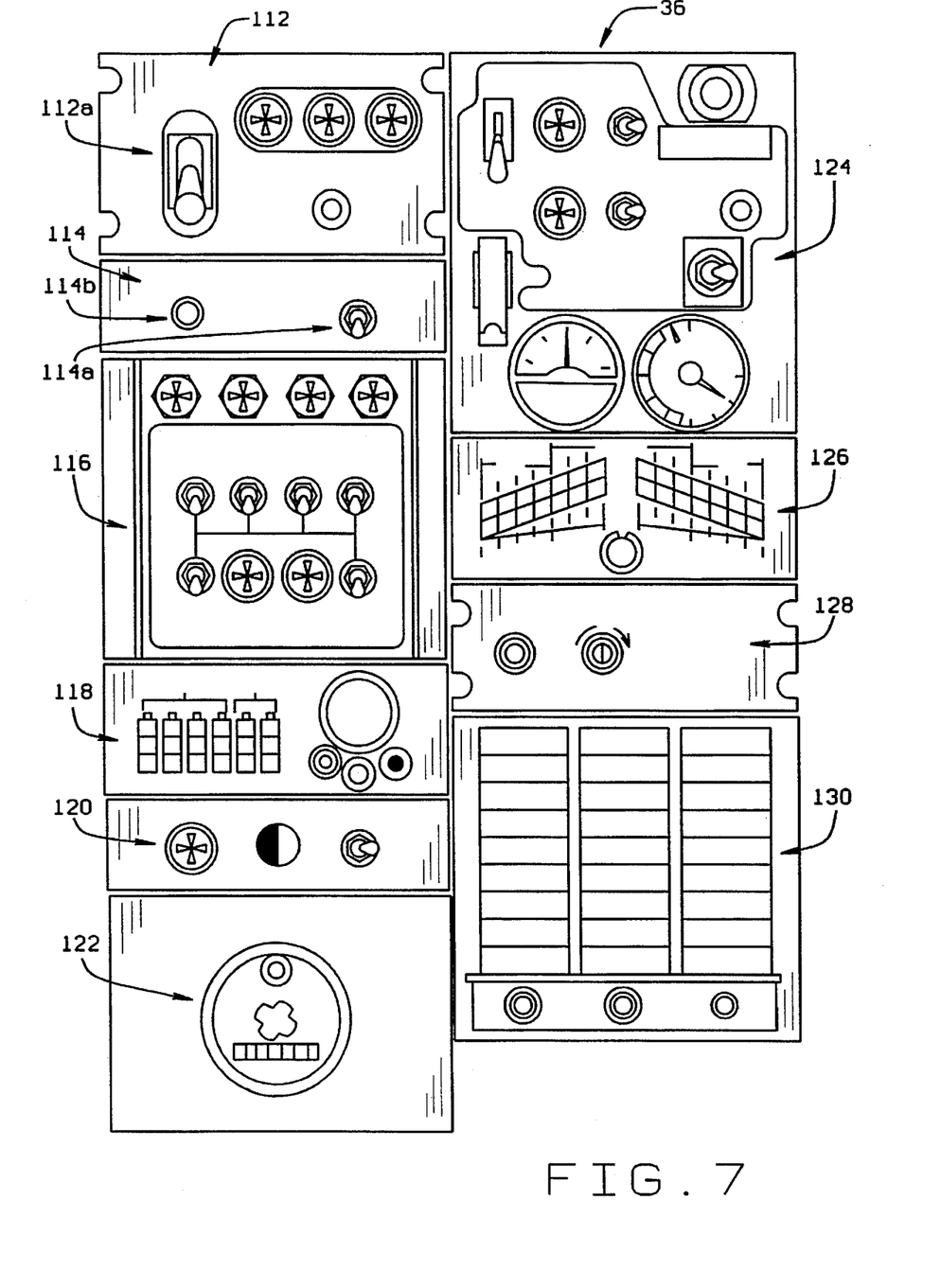
FIG. 7 is a schematic illustration of the aft pedestal instrument panel of the invention.

Aft pedestal 36 is located between the captain's seat 12 and the first officer's seat 14 and aft of the existing pedestal 44. The ergonomic design of the aft pedestal 36 provides for access by both crew members to aircraft control panels relocated from flight engineer's panel 26 and flight engineer's auxiliary panel 28. The importance of equal access for both crew members to aft pedestal 36 is twofold, (1) either crew member may have access to control panels in the event of incapacitation, and (2) it facilitates workload balancing between the two crew members.

The control instruments that are mounted on the aft pedestal instrument panel 36 are shown in FIG. 7. The aft pedestal instrument panel 36 contains the fuel dump, APU (auxiliary power unit), flight recorder test, the service interphone units, electrical fault annunciator, flap caution, flight recorder trip, and the flight date instrumentation, all of which are relocated from the flight engineer's auxiliary panel of the standard 727 aircraft. The aft pedestal panel 36 also contains the stall warning which is relocated from the overhead panel of the standard 727 aircraft.

As seen in FIG. 7, the aft pedestal instrument panel 36 is arranged in two vertical columns of instruments. Beginning with the top of the left column, the strut and body overheat indicators 112 are relocated from the upper center of the flight engineer's panel of a standard 727 aircraft. These indicators are unmodified from their configuration or use in the standard 727 aircraft. However, any overheat condition causes the pneumatic/AC master caution lamp to light on the master caution indicator panel yet to be described. The instruments also include an anti-ice trip switch 112a.

The ground power instruments 114, including the ground power switch 114a and associated AC connected indicator light 114b, are relocated from the flight engineer's panel of the standard 727 aircraft to the aft pedestal panel 36 so that they are positioned close to the other ground operable source, the APU (auxiliary power unit).

The fuel dump instruments 116 are relocated from the flight engineer's auxiliary panel of the standard 727 aircraft to the aft pedestal panel 36. These instruments are unmodified from their configuration or use in the standard 727 aircraft.

The flight recorder trip and date indicators 118 are relocated from the flight engineer's auxiliary panel of the standard 727 aircraft to the aft pedestal panel 36. These indicators are unmodified from their configuration or use in the standard 727 aircraft.

The stall warning indicator 120 is relocated from the standard 727 aircraft overhead panel to the aft pedestal panel 36. The indicator is unmodified from its configuration or use in the standard 727 aircraft.

The elapsed time meter 122 is relocated from the flight engineer's auxiliary panel of the standard 727 aircraft to the aft pedestal panel 36. The meter is unmodified from its configuration or use in the standard 727 aircraft.

The auxiliary power unit (APU) controls 124 are mounted at the top of the right side column of instruments of the aft pedestal control panel 36. The APU controls 124 are relocated from the flight engineer's auxiliary panel of the standard 727 aircraft to the position of the aft pedestal panel 36 shown. These controls are unmodified from their configuration or use in the standard 727 aircraft. However, the APU on condition will provide a signal to the take-off configuration of the master caution warning lamp mounted on the master caution indicator panel yet to be described.

The flaps position indicators 126 are relocated from an aft position on the second stack of the overhead panel of the standard 727 aircraft to the aft pedestal panel 36. The indicators are unmodified from their configuration or use in the standard 727 aircraft.

The service interphone control 128 is relocated from an aft position on the second stack of the overhead panel of the standard 727 aircraft to the aft pedestal panel 36. The control is unmodified from its configuration or use in the standard 727 aircraft.

The electrical annunciator indicators 130 are relocated from an aft position on the second stack of the overhead panel of the standard 727 aircraft to the aft pedestal panel 36. These indicators are unmodified from their configuration or use in the standard 727 aircraft. All of the indicator lights are tied to the electrical light on the master caution indicator panel yet to be described.

Captain's Knee Instrument Panel

The captain's knee instrument panel 38 and first officer's knee instrument panel 40 are added to the cockpit to add additional equipment where it is accessible for operation by the first crew member (pilot or captain) and the second crew member (copilot or first officer). The captain's knee panel 38 is illustrated in FIG. 8. The captain's knee panel 38 contains the yaw damper controls 38a, the GPWS 38b, and the auxiliary gyro panel 38c all of which were relocated from an aft position in the second stack of the overhead panel of the standard 727 aircraft. These controls are unmodified from their configurations or use in the standard 727 aircraft.

First Officer's Knee Instrument Panel

The first officer's knee panel 40 contains the hydraulic brake interconnect panel 40a, which is relocated from the flight engineer's panel of the standard 727 aircraft. This control is unmodified from its configuration or use in the standard 727 aircraft.

Master Caution Indicator Panel

The master caution indicator panel 134 is located on the front instrument panel 22 of the cockpit where it is in the line of sight of both the first crew member (pilot or captain) and the second crew member (co-pilot or first officer). Caution indicators from the extended overhead panel 34 and the aft pedestal panel 36 are electrically tied into master caution indicator lights mounted on the master caution panel 134. Illumination of any of the caution indicators on the extended overhead panel and the aft pedestal panel will light the master caution lamps for both the first and second crew members. Pressing the master caution lights will cause the master caution lamps to extinguish. Cockpit caution indicators that are tied into the indicators of the master caution panel 134 include the door light panel which is the same as in the standard 727 aircraft, the overheat caution indicator on the window heat panel, the duct overheat, lower aft body overheat or strut overheat caution indicators as well as any caution indicators on the pneumatic panel, the auto fail or off schedule descent caution indicators, the elevator feel, differential pressure, rudder condition or emergency exit warning indicators, any caution indicator on the electrical panel, any caution indicator on the fuel panel, the APU ON indicator, the ground cooler ON indicator, and the auto pack trip indicator.

In order to aid the captain and/or first officer in determining the correct power settings for the aircraft's three engines, an engine pressure ratio (EPR) computer is provided for calculating the correct EPR settings for each of the three engines and displaying the maximum recommended settings of engine pressure ratio for the three engines. Currently, 727 aircraft rely on the flight engineer monitoring the altitude, air temperature, and the status of pressurization and anti-ice systems in order to compute the appropriate maximum EPR settings for the aircraft's three engines from tables in the standard flight manual. Some 727 aircraft have data computers that off load this task and compute a variety of EPR values automatically. In order to reduce the workload for the two member crew of the present invention and to provide for continuous maximum EPR values for the current operating conditions of the aircraft, the various tables normally located in the standard flight manual have been recorded into the memory of the EPR computer 140 of the present invention shown in FIG. 10. The display portion or panel 142 of the EPR computer provides an automatic display readout for each of the aircraft's three engines 144, 146, 148, a readout or display for the total air temperature 150, and a readout or display for the pressure altitude 152. A manually rotatable knob 154 provides mode selection for a take off mode, a climbing mode, a maximum continuous mode or cruise mode, and a go around mode. The EPR computer has a manual temperature input knob 156 that allows the crew members to set the total air temperature (TAT) for takeoff, overriding the conventional temperature probe inputs on the outside of the aircraft that may be inaccurate at the time of take-off due to sun exposure.

Figure 10:
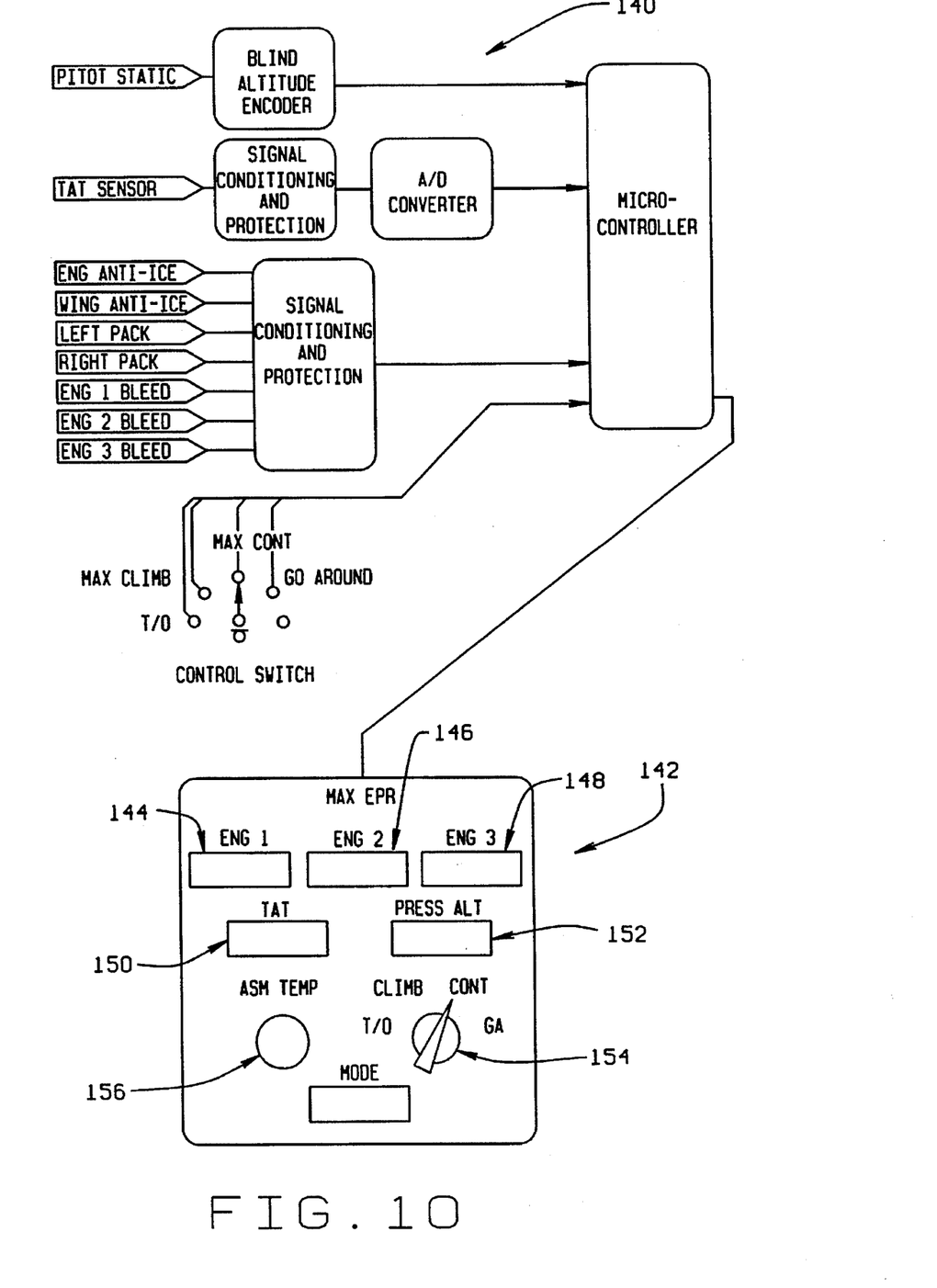
FIG. 10 is an illustration of the engine pressure ratio instrument panel and its control system.

The EPR computer panel 142 replaces the standard total air temperature gauge on the standard 727 front instrument panel and provides a digital readout of total air temperature. The computer receives input information from the anti-ice and the pressurization control instruments to determine the various adjustments necessary for adjusting engine power in accordance with the maximum engine power values set forth by the standard tables recorded in the systems memory.

The system design illustrated in FIG. 10 is simplified to reduce the possibility of error and to allow for easy testing of the system. Known electronic circuitry is utilized for converting analog and voltage level signals to digital five volt logic levels. A table look up microprocessor program converts stored table values of EPR from the input analog and voltage level signals and displays EPR values. The electronics consist of a single channel microcomputer with the multiple sensors shown in FIG. 10. The pilot or first officer can view both the total air temperature (TAT) and pressure altitude readouts and use these values as a test of system integrity. The source code also contains error checking routines with programmed limits on acceptable readings for altitude and total air temperature to assist in detecting faulty sensors that provide values of altitude and air temperature that exceed these programmed limits. A continuous test of the system's memory is provided by computer checksums of the ROM which, if found to be acceptable, will cause a hardware timer to be reset. A fault detected in either of the limits test or checksums tests will cause the hardware timer to time out and disable the readouts, thereby alerting the two crew members to use the backup tables in their flight manuals.

The display for TAT will flash its digital readout slowly when a manual setting has been entered using the knob 156 to indicate to the crew members that the temperature probes have been overridden. Pushing on the settings knob 156 or turning the knob 154 to a takeoff condition will cause the computer to revert to using and displaying the probe temperature.

The manual landing gear extension mechanism 42 is relocated to a floor position just aft of the existing pedestal 44 as shown in FIG. 1. The gear ratio is modified to make cranking from a seated position in either the captain's seat 12 or first officer's seat 14 easier.

In the foregoing description and explanation of the apparatus and method of the invention, it has been assumed that the major application of the apparatus and method is to provide complete conversion from a three crew member aircraft to a two crew member aircraft. There are many other potential partial applications of the apparatus and method which may be utilized. These include the master caution system, which can also be applied to existing three crew member aircraft with little alteration to increase safety.

While the present invention has been described by reference to a specific embodiment, it should be understood that modifications and variations of the invention may be constructed without departing from the scope of the invention defined in the following claims.

What is claimed is:

1. In an aircraft customarily designed and rated for flight having a three-man cockpit crew, said three-man cockpit crew customarily comprising a captain, a first officer, and a flight engineer, and said aircraft having a cockpit within which systems controls are mounted for access and use by a flight crew, the improvement comprising an aircraft systems control mounted in said cockpit for access and use by a two-man cockpit crew;

said aircraft systems control includes a plurality of controls for controlling a plurality of systems aboard said aircraft, at least one of said controls being partially automated to thereby reduce the workload required to monitor and operate said controls and thereby accommodate safe and efficient operation of said aircraft by two crew members;

said partially automated controls include a fuel control, an electrical control, and an environmental control;

said partially automated electrical control includes an automatic mode for engagement after pre-flight checks and a manual mode, said automatic mode having means for automatically maintaining automatic optimum configuration of the electrical system;.

said automatic mode includes means for automatically continuously testing for a fault condition and means responsive thereto for attempting to correct for a detected fault condition; and a mechanical extension of a manual gear extension operating apparatus to within operable access of a seated first or second crew member without modification to an underfloor manual gear apparatus.

2. In an aircraft cockpit having pilots' aircraft systems' control means arranged in the cockpit for access and operation by a first crew member from a captain's seat and by a second crew member from a first officer's seat, and having a flight engineer's aircraft systems' control means arranged in the cockpit for access and operation by a third crew member from a flight engineer's seat, both the pilots' aircraft systems' control means and the flight engineer's aircraft systems' control means being connected in electrical communication with an underlying electrical system of the aircraft, an improvement adapting the cockpit for operation by only the first crew member and the second crew member by relocating and automating the flight engineer's aircraft systems' control means, the improvement comprising:

an integrated aircraft systems' control means added to the cockpit and connected in electrical communication with the underlying electrical system of the aircraft, the integrated aircraft systems' control means including the pilots' aircraft systems' control means and the flight engineer's aircraft systems' control means relocated in the cockpit for access and operation by the first crew member from the captain's seat and by the second crew member from the first officer's seat.

3. The improvement of claim 2, further comprising:

the integrated aircraft systems' control means including automated flight engineer's aircraft systems controls, the automated flight engineer's aircraft systems' controls reducing the first and second crew members' workload to monitor and operate the integrated aircraft systems' controls.

4. The improvement of claim 3, further comprising:

the automated flight engineer's aircraft systems' controls including fuel system controls with automated fuel quantity indicators monitored electronically for determining an imbalance of fuel contained in extant fuel tanks of the aircraft.

5. The improvement of claim 3, further comprising:

the automated flight engineer's aircraft systems' controls including electrical system controls with means for automatically switching between at least two extant sources of power on the aircraft from one in use source of power to another source of power on sensing a loss of power from the one generator source.

6. The improvement of claim 3, further comprising:

the automated flight engineer's aircraft systems' controls including electrical system controls with means for monitoring power provided by at least two extant generators of the aircraft and for monitoring an extant bus tie paralleling the two generators, and with means for automatically reconnecting to the bus tie any one of the two generators dropped off the bus tie by an open breaker of the bus tie.

7. The improvement of claim 3, further comprising:

the automated flight engineer's aircraft systems' controls including electrical system controls with single means for providing an indication of an operative status of at least two extant generators of the aircraft and a manual control for selecting the generator operative status to be provided by the single means.

8. The improvement of claim 7, further comprising:

the single means includes a single indicator displaying generator oil temperature operative status, a single indicator displaying generator voltage operative status, and a single indicator displaying generator frequency operative status.

9. The improvement of claim 3, further comprising:

the automated flight engineer's aircraft systems' controls including environmental system controls with means for monitoring operation of extant generators of the aircraft and monitoring engine operation, and for automatically reducing the number of environmental system controls which are operating whenever a generator shut-down or engine shut-down is sensed.

10. The improvement of claim 2, further comprising:

the integrated aircraft systems' control means including automated caution indicator monitors with means for providing a visible caution indication in response to a detected activated caution indicator from either of the pilots' aircraft systems' control means and the flight engineer's aircraft systems' control means and in response to detected inadvisable integrated aircraft systems' control means settings.

11. The improvement of claim 2, further comprising:

the integrated aircraft systems' control means including means for computing desired exhaust pressure ratio values for the aircraft engines in response to detected air temperature, aircraft altitude and the integrated aircraft systems' operative status.

12. The improvement of claim 2, further comprising:

means for accessing and operating an extant manual landing gear extension apparatus by the first crew member from the captain's seat and by the second crew member from the first officer's seat.

13. The improvement of claim 2, further comprising:

the integrated aircraft systems' control means including an overhead instrument panel added to the cockpit and arranged in the cockpit for access and operation by the first crew member from the captain's seat and by the second crew member from the first officer's seat, the overhead instrument panel having instruments thereon that have been relocated from the flight engineer's aircraft systems' control means.

14. The improvement of claim 13, further comprising:

a support for the flight engineer's aircraft systems' control means is removed from the cockpit.

15. The improvement of claim 13, further comprising:

an aft pedestal instrument panel added to the cockpit and arranged between and accessible from the captain's and first officer's seats, the aft pedestal instrument panel having instruments thereon that have been relocated from the flight engineer's aircraft systems' control means.

16. The improvement of claim 15, further comprising:

a master caution indicator panel added to the cockpit and arranged forward of the captain's seat and the first officer's seat for viewing by the first crew member from the captain's seat and by the second crew member from the first officer's seat, the master caution indicator panel having means for emitting a visible caution signal in response to a caution signal transmitted from instruments on the aft pedestal instrument panel.

17. The improvement of claim 16, further comprising:

the master caution indicator panel having means for emitting a visible caution signal in response to a caution signal transmitted from the overhead instrument panel.

18. The improvement of claim 13, further comprising:

a master caution indicator panel added to the cockpit and arranged forward of the captain's seat and the first officer's seat for viewing by the first crew member from the captain's seat and by the second crew member from the first officer's seat, the master caution indicator panel having means for emitting a visible caution signal in response to caution signals transmitted from the overhead instrument panel.

19. The improvement of claim 2, further comprising:

the integrated aircraft systems' control means including an aft pedestal instrument panel added to the cockpit and arranged between the captain's seat and the first officer's seat for access and operation by the first crew member from the captain's seat and the second crew member from the first officer's seat, the aft pedestal instrument panel having instruments thereon that have been relocated from the flight engineer's aircraft systems' control means.

20. The improvement of claim 19, further comprising:

a master caution indicator panel added to the cockpit and arranged forward of the captain's seat and the first officer's seat for viewing by the first crew member from the captain's seat and by the second crew member from the first officer's seat, the master caution indicator panel having means for emitting a visible caution signal in response to caution signals transmitted from the aft pedestal instrument panel.

21. The improvements of claim 2, further comprising:

a master caution indicator panel added to the cockpit and arranged forward of the captain's seat and the first officer's seat for viewing by the first crew member from the captain's seat and by the second crew member from the first officer's seat, the master caution indicator panel having means for emitting a visible caution signal in the line of sight of the first crew member from the captain's seat and the second crew member from the first officer's seat in response to a caution signal transmitted by the integrated aircraft systems' control means.

22. In an airplane cockpit having a forward instrument panel and an overhead instrument panel arranged in the cockpit for access and operation by a first crew member from a captain's seat and by a second crew member from a first officer's seat, and having a flight engineer's instrument panel arranged in the cockpit for access and operation by a third crew member from a flight engineer's seat, both the overhead instrument panel and the flight engineer's instrument panel being connected in electrical communication with an underlying electrical system of the aircraft, a method of converting the cockpit for operation by only the first crew member and the second crew member by relocating instruments from the flight engineer's instrument panel, the method comprising:

removing instruments from the flight engineer's instrument panel and relocating said removed instruments to positions in the cockpit that are separated from the flight engineer's instrument panel, said relocated instruments being accessible from the captain's seat by the first crew member and from the first officer's seat by the second crew member.

23. The method of claim 22, further comprising:

automating instruments from the flight engineer's instrument panel to reduce the first and second crew members' workload in monitoring and operating the relocated instruments from the flight engineer's instrument panel.

24. The method of claim 23, further comprising:

automating fuel system controls with fuel quantity indicators monitored electronically for determining an imbalance of fuel contained in extant fuel tanks of the aircraft.

25. The method of claim 23, further comprising:

automating electrical system controls with means for automatically switching between at least two extant sources of viable power for the aircraft from one in use source of power to another source of viable power on detecting a loss of power of the one in use source of power.

26. The method of claim 23, further comprising:

automating electrical system controls with means for monitoring power provided by at least two extant generators of the aircraft and for monitoring an extant bus tie paralleling the two generators, and automating the electrical system controls with means for automatically reconnecting the bus tie to any one generator dropped off the bus tie by an open breaker of the bus tie.

27. The method of claim 23, further comprising:

automating electrical system controls with single means for providing an indication of an operative status of at least two extant generators of the aircraft and with a manual control for selecting the generator operative status to be provided by the single means.

28. The method of claim 27, further comprising:

providing the single means with a Single indicator displaying generator oil temperature operative status, a single indicator displaying generator voltage operative status, and a single indicator displaying generator frequency operative status.

29. The method of claim 23, further comprising:

automating environmental system controls with means for monitoring operation of extant generators of the aircraft and monitoring engine operation, and with means for automatically reducing the number of environmental system controls which are operating whenever a generator shut-down or engine shut-down is sensed.

30. The method of claim 22, further comprising:

adding among the relocated instruments means for computing desired engine pressure ratio values for the aircraft engines in response to detected air temperature, aircraft altitude and the integrated aircraft systems' operative status.

31. The method of claim 22, further comprising:

adding to the cockpit means for accessing and operating an extant manual landing gear extension apparatus by the first crew member from the captain's seat and by the second crew member from the first officer's seat.

32. The method of claim 22, further comprising:

adding an overhead instrument panel to the cockpit in a position above and between the captain's seat and the first officer's seat where it is accessible by the first crew member from the captain's seat and by the second crew member from the first officer's seat, and relocating said removed instruments to the overhead instrument panel.

33. The method of claim 32, further comprising:

adding a master caution indicator panel to the cockpit arranged forward of the captain's seat and the first officer's seat for viewing by the first crew member from the captain's seat and by the second crew member from the first officer's seat; and providing means on the master caution indicator panel for emitting a visible caution signal in response to a caution signal received from instruments on the overhead panel.

34. The method of claim 22, further comprising:

adding an aft pedestal instrument panel to the cockpit spaced from the forward instrument panel and positioned between the captain's seat and the first officer's seat where it is accessible by the first and second crew members from the captain's seat and the first officer's seat, respectively; and, removing instruments from the flight engineer's instrument panel and relocating removed instruments to the aft pedestal instrument panel where the relocated instruments are accessible from the captain's seat and the first officer's seat by the first and second crew members, respectively.

35. The method of claim 34, further comprising:

adding a master caution indicator panel to the cockpit arranged forward of the captain's seat and the first officer's seat for viewing by the first crew member from the captain's seat and by the second crew member from the first officer's seat; and, providing means on the master caution indicator panel for emitting a visible caution signal in response to a caution signal received from instruments on the aft pedestal instrument panel.

* * * * *